March 2, 1965  H. H. HAMMER  3,171,997
DIRECT CURRENT SMALL MOTOR
Filed May 19, 1960  2 Sheets-Sheet 1

INVENTOR.
Heinz Hermann Hammer
BY

March 2, 1965 H. H. HAMMER 3,171,997
DIRECT CURRENT SMALL MOTOR
Filed May 19, 1960 2 Sheets-Sheet 2

INVENTOR.
Heinz Hermann Hammer
BY

United States Patent Office 3,171,997
Patented Mar. 2, 1965

3,171,997
DIRECT CURRENT SMALL MOTOR
Heinz Hermann Hammer, Nurnberg, Germany, assignor to Firma Diehl (Kommandit-Gesellschaft), Nurnberg, Germany
Filed May 19, 1960, Ser. No. 30,297
Claims priority, application Germany, May 23, 1959, D 30,722
4 Claims. (Cl. 310—233)

The present invention relates to a direct current small motor in which the feeding of the current to the commutator is effected by unilaterally supported or clamped wire or strip-shaped contact brushes which are preferably pretensioned.

With motors of the above mentioned type, in addition to a wear-off of the brushes and a running-in of the commutator by mechanical friction there is also encountered a reduction in the material of at least one of the brushes and of the trailing edges of the commutator segments in view of the movement of the material as well as due to burning-off losses at the interruption arc. In view of this electrically caused wear-off, the brush connected to the plus voltage and on that side thereof located where the commutator leaves the brush will, within the course of time, be worn off and reduced to such an extent that eventually, especially when a contact material is applied on or rolled into the brush in the customary manner and has been reduced, burn off and will break.

It is, therefore, an object of the present invention to provide a direct current small motor which will overcome the above mentioned drawbacks.

It is another object of this invention to provide a direct current small motor in which even after complete burning off of the plus brush, the commutator will not be damaged to any material extent.

It is a further object of this invention to provide a direct current small motor which has a considerably longer life than heretofore known motors of comparable output and dimensions.

These and other objects and advantages of the invention will appear more clearly from the following specification in connection with the accompanying drawing in which.

Figure 1:
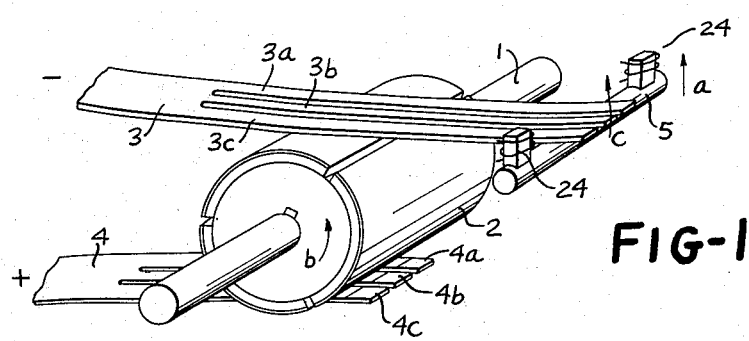
FIG. 1 illustrates diagrammatically a perspective view of a computator with current feeding brushes in conformity with the present invention.

The present invention is based on the finding that the motor in spite of the above mentioned wear-off or reduction of the brush connected to the plus voltage will still remain fully operative if the burning off occurs at the free end of the brush, i.e. at that end of the brush which is not directly supported or clamped in.

To this end, according to the present invention, the direction of rotation of the commutator and the direction of flow of the current in the commutator circuit is so selected that with the brush subjected to a reduction, the interruption arc will occur at the free end of the brush resting on the commutator.

On the brush connected to the minus voltage, there will occur a build up of the brush at the run off side of the commutator, which build up is effected by the movement of the material from the commutator to the brush.

According to a further feature of the invention, with motors adapted to be switched off by lifting a brush, the brush encountering a build up in view of the movement of the material is made tiltable or movable away from the commutator.

The extent of wear of a contact due to the movement of material and burning off in the light arc is dependent also to a great extent on the property of the contact material. With direct current small and miniature motors, it is generally customary to provide at least the brushes with noble metal contacts. With low voltage motors, the contact material at the brushes and commutator must have not only a high conductivity and high resistance against oxidation, but it must also be wear-resistant. Furthermore, the material must be resistant against a reduction by movement of the material and against burning off in the arc. Noble metal contacts, for instance of silver, have a high conductivity. By suitable alloy additions, it is possible to make them correspondingly wear-resistant and resistant against oxidation. However, with such noble metal contacts, a relatively fast reduction of the brushes occurs in view of the movement of the material. The heretofore known contact materials, as they are employed for instance for contact pairs of switches or the like, have not proved suitable for the purpose of the present invention because they are not wear resistant or have a too high inherent resistance.

Tests have proved that for the above mentioned purpose of the present invention an alloy composition of silver with palladium and cadmium is highly successful for the commutator. Said alloy composition may preferably consist of from 20 to 50% palladium, from 5 to 15% of cadmium, and the rest may be silver; especially advantageous has been found a composition of 30% palladium, 10% cadmium, and 60% silver. The brushes may be covered with a contact material of from 60 to 70% silver and from 30 to 40% palladium. These percentages are all percent by weight.

Referring now to the drawings in detail, the direct current motor shown therein comprises a commutator 2 keyed to a shaft 1 and having three contact pieces or segments. The commutator 2 is resiliently engaged by two brushes 3 and 4 which have one end thereof (the left end with regard to the drawing) clamped into a stationary support 20 (see FIG. 5). The brush 3 represents the minus brush which is somewhat longer than the plus brush 4 and is adapted by means of a lift off element such as a pin 5 (FIG. 1) to be moved in the direction of the arrow $a$ in FIG. 1 for lifting the brush 3 off from the commutator 2 to thereby interrupt the motor circuit. The brushes 3 and 4 are preferably provided with resilient tongues 3a, 3b, 3c and 4a, 4b, 4c respectively.

Figure 2:
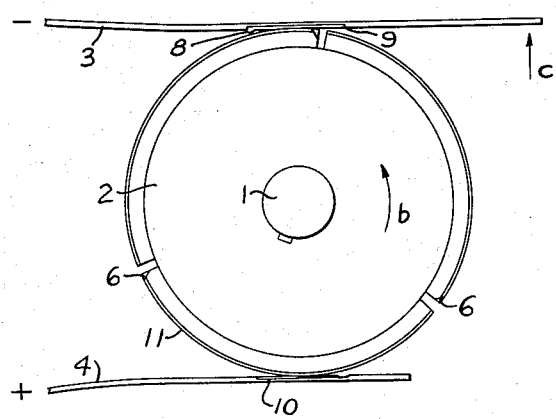
FIG. 2 is a front view of the arrangement shown in FIG. 1 but on a larger scale than the latter.

As will be evident from FIG. 2, the brushes 3 and 4 have that surface portion which is intended for engagement with the commutator 2 provided with a coat or covering layer 9, 10 of a contact material which may for instance be rolled into the brush material. When the current passes from the plus brush 4 through the commutator 2 to the minus brush 3, a transfer of material will occur from the cover 10 of the plus brush 4 to the commutator 2, especially from the run-off edges 6 of the commutator segments to the minus brush 3 or the cover or layer 9 thereof. Therefore, at the plus brush 4 at 7 and at the edges 6 of the commutator 2 there will occur a reduction, whereas a buildup will occur at the minus brush 3 at 8.

Figure 3:
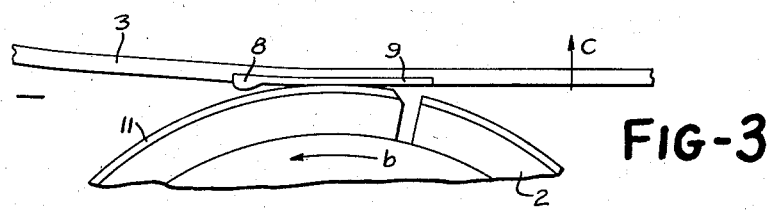
FIG. 3 is a fragmentary view drawn at enlarged scale showing the negative brush.
Figure 4:
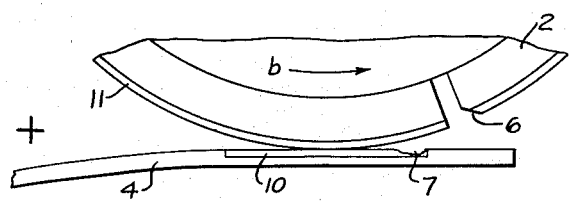
FIG. 4 is a fragmentary view drawn at enlarged scale showing the positive brush.

The build up on brush 3 is shown at enlarged scale in FIG. 3 and the reduction of brush 4 is shown at enlarged scale in FIG. 4.

As has been mentioned above, according to the present invention the transfer of the cover 10 by the interruption arc at the run-off side of commutator 2 can be reduced to a considerable extent by a contact combination of silver-palladium on brush 4 at a ratio of from 60:40 to 70:30. Similarly, the transfer of the material at the edges 6 of the commutator can be considerably reduced by a commutator layer 11 of silver-palladium-cadmium at a ratio of 60:30:10 respectively.

As will be evident from FIGS. 2 and 4, the plus brush 4 or the cover 10 thereof will be carried off primarily at the run-off from brush 4 at point 7, and side of the commutator 2 where an interruption arc will be drawn between edge 6 of the commutator segments and brush 4. Brush 4 will, therefore, at this point encounter a reduction. When the commutator 2 rotates in a direction indicated by the arrow b, which is the constant direction of rotation of the commutator, the reduction will thus occur at the free end of brush 4. This, however, is not dangerous at all because even after a longer running period of the motor and a complete carrying off of the contact cover or layer 10, the motor will remain completely operable. The only difference will be that the light arc will now occur somewhat further inwardly. If, assuming the same direction of flow of the current, for instance by reversing the poles of the stator field, the direction of rotation were changed, the burning off loss would occur at the clamped-in resiliently loaded side of the brush 4. Due to the permanent bending stress, brush 4 would, after a certain wear, bend off, and the remainder would be pushed into the commutator 2 whereby the motor would immediately become useless. Tests have proved that with an arrangement according to the present invention the life of the motor will be multiplied over what it is at present, while even after a complete burn-off of the plus brush 4, the commutator 2 would not encounter any material damage.

Figure 5:
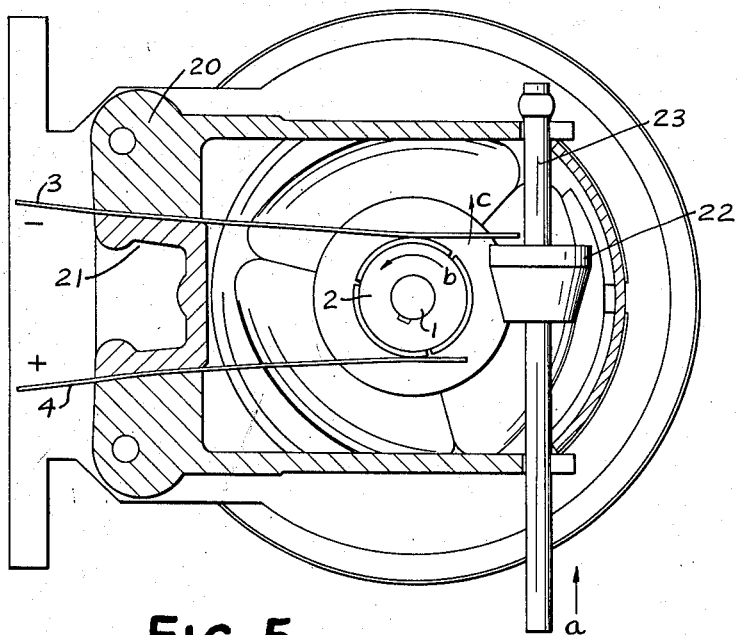
FIG. 5 is an enlarged section view of the commutator end of an actual miniature motor constructed according to the present invention.

As has been mentioned above and has been clearly illustrated in FIGS. 2 and 3, a small buildup caused by the movement of the material will occur at the minus brush 3. Aside from the mechanical wear, the minus brush 3 would not be reduced. This brush 3 therefore can whenever desired be designed as a lift-off brush as illustrated in FIGS. 1 and 5, as by the pin 5, and moving in the direction of the arrow a and brush movement is illustrated in FIG. 2 by arrow c. If to this end the plus brush 4 were employed, the latter would already break off after a certain burn-off 7 and the motor could not be switched off any more. As far as the minus brush 3 is concerned, this may be made of a contact material such as has been suggested for the plus brush 4. Since due to the movement of the material the said brush 3 will be covered at the point of contact with commutator 2 by a contact material of the commutator 2, for instance with a cover of silver, it is also sufficient to provide said brush with a corresponding conducting and wear-resistant cover 9. Thus, the brush may for instance be thiocyanated.

FIG. 5 shows an arrangement according to the present invention embodied in an actual motor structure. Stationary support 20 is a part of the motor frame and brushes 3 and 4 are clamped in place therein by a tapered plug 21. The lift off element in FIG. 5 is a block-like portion 22 on rod 23. The pin 5 in FIG. 1 is actuated by electromagnetic means 24 and rod 23 can similarly be actuated by an electromagnet to move the rod in the direction of arrow a to lift brush 3 from commutator 2.

It is, of course, to be understood that the present invention is, by no means, limited to the particular construction shown in the drawing but also comprises any modifications within the scope of the appended claims.

What I claim is:

1. A unidirectional direct current small motor with a commutator, two resilient contact blades contacting the commutator at spaced points thereabout, stationary supporting means, one end of each said contact blade being clamped in said supporting means, means for lifting one of said blades off the commutator to interrupt operation of said motor, said commutator being provided with a plurality of circumferentially distributed contact pieces of which at least that surface which is engaged by the said blades consists of a silver-palladium-cadmium alloy, the one of said blades which is positive and which is therefore subjected to a wear-off of material having at least that portion thereof which engages the commutator provided with a layer of contact material which consists of a silver-palladium alloy, the said one of said blades which is lifted off the commutator being the negative blade and an extension thereon on the end opposite said support means which extends beyond the said commutator, said lift-off means engaging said extension.

2. A direct current small motor according to claim 1 in which the said supporting means is so arranged that the commutator is moving away from the clamped end of at least the positive blade where the said commutator engages said blade.

3. A unidirectional direct current small motor with a commutator, and having two blade-like contact brushes frictionally engaging said commutator at spaced points, stationary supporting means having one end of each of said contact brushes clamped therein, means on one of the contact brushes at the free end thereof for lifting the same off from the commutator, the direction of rotation of the commutator being so selected that the transfer of material from a brush to the commutator will take place at the free end of the other and non-liftable contact brush, said contact brushes in the region of the portions thereof that contact the commutator having a surface comprising an alloy containing from about 60% to 70% silver and about 30% to 40% palladium, while said commutator comprises a plurality of circumferentially distributed contact pieces of which at least the surface thereof consists of an alloy comprising 20% to 50% palladium, 5% to 15% cadmium, and the remainder silver, the said contact brush which is adapted for being lifted off the commutator being the negative brush.

4. A direct current small motor according to claim 3 in which the direction of rotation of the commutator is such that the transfer of material from the positive brush to the commutator takes place at the free end of the positive brush.

References Cited by the Examiner

UNITED STATES PATENTS

| 518,033 | 4/94 | Henry | 310—244 |
| 641,012 | 1/00 | Heidel | 310—240 |
| 1,270,957 | 7/18 | Kolff | 310—244 |
| 1,415,233 | 5/22 | Fahrenwald | 200—166 |
| 1,874,094 | 8/32 | Ford et al. | 310—240 |
| 2,058,857 | 10/36 | Emmert | 200—166 |
| 2,353,047 | 7/44 | Lannert | 310—251 |
| 2,360,522 | 10/44 | Shobert | 310—251 |
| 2,377,260 | 5/45 | Nardone | 310—240 |

OTHER REFERENCES

Lemkin, William: Visualized Chemistry, Oxford Book Co., New York, N.Y., 1952, chapter 22, pages 240–241.

McGraw-Hill Encyclopedia of Science and Technology, vol. 9, p. 523, McGraw-Hill Book Co., New York, N.Y.

German printed application S 30159 VIIIb/21d[1], May 9, 1956.

MILTON O. HIRSHFIELD, *Primary Examiner.*